Feb. 27, 1951 — H. J. KASLER — 2,543,029
HOME MOVING PICTURE CABINET
Filed May 27, 1946
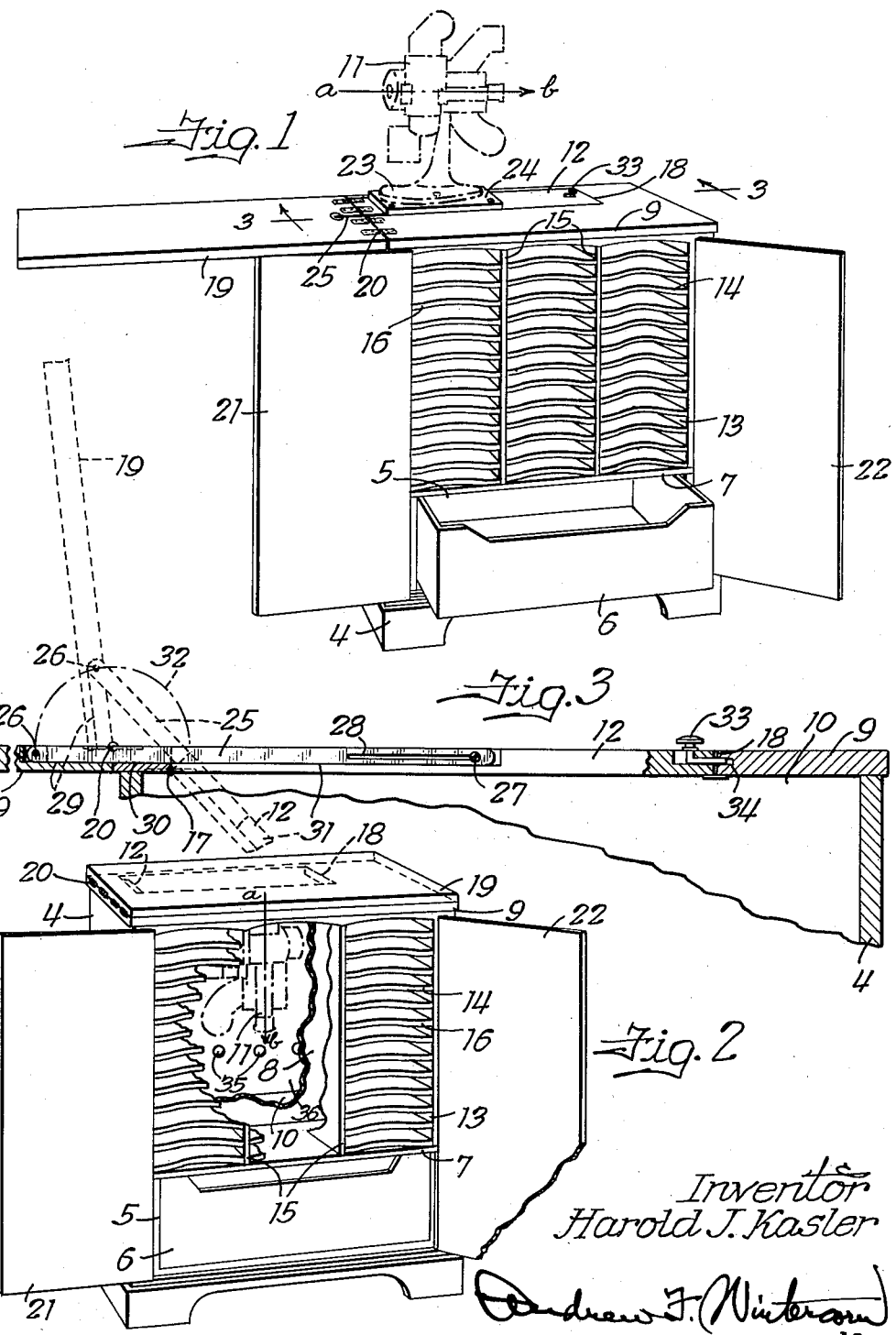
Inventor
Harold J. Kasler Patented Feb. 27, 1951

2,543,029

UNITED STATES PATENT OFFICE 2,543,029

HOME MOVING PICTURE CABINET

Harold J. Kasler, Rockford, Ill.

Application May 27, 1946, Serial No. 672,428

4 Claims. (Cl. 312—26)

This invention relates to a moving picture cabinet designed for use in the home to store the projector and all of the paraphernalia associated therewith and also the films in an orderly manner so that they can be easily removed and replaced.

One of the principal objects of my invention is to provide a cabinet of the kind mentioned divided vertically by a partition into a projector compartment in one half and a film storage compartment in the other half, the projector compartment having an opening in its top wall in which a panel is hinged carrying the projector and arranged to swing downwardly into the projector compartment so that the projector can be lowered to an out of the way position for storage, there being another top cover panel that is hinged to the top wall of the cabinet to be folded onto the top to form a neat cover for the cabinet and close the opening left when the projector supporting panel is swung down.

Another object of the invention is to provide a cabinet of the kind mentioned in which the cover panel and projector supporting panel are interconnected by a fall support link that is pivoted at one end to the one panel and slidably pivoted at its other end to the other panel in such relation to the hinges for the two panels that the projector supporting panel is automatically raised or lowered in the unfolding and folding of the cover panel and the two panels are mutually supported by the fall support link when the cover panel is unfolded holding the projector supporting panel in the raised substantially horizontal position. This construction affords the advantage that the operator can put the projector away after using it without danger of touching anything hot and he does not have to wait until the projector has cooled off before he can close up the cabinet.

Another object is to provide in a cabinet of the kind mentioned, a sliding bolt or other latch means on the free end of the projector supporting panel to lock it releasably to the top wall of the cabinet in the operative position and relieve the fall support link of any unnecessary strain while giving firm support for the projector so that the operator is free to bear down on this panel if he cares to do so while operating the projector.

Still another object is to provide a cabinet of the kind mentioned in which the projector storage compartment extends across the rear of the cabinet leaving the entire front portion to be devoted to a film storage rack, there being also a drawer provided beneath the rack reaching to the full depth of the cabinet to receive larger things that cannot be accommodated in the rack, the rack and drawer being covered up by a hinged door or doors provided on the front of the cabinet so that the cabinet when closed will present a neat and attractive appearance.

The invention is disclosed in the accompanying drawings, in which

Fig. 1 is a perspective view of the cabinet opened up for use of the projector and illustrating the film storage rack and storage drawer therebeneath which are exposed when the doors on the front of the cabinet are opened;

Fig. 2 is a perspective view of the cabinet closed up with the exception of the front doors which have been left open to reveal the film storage rack, a portion of which, together with the partition wall behind it, has been broken away to show the projector stored in the rear compartment behind the partition wall, and Fig. 3 is a vertical sectional detail on the line 3—3 of Fig. 1 showing the fall support link and its connections with the cover panel and projector supporting panel as well as its relation to the hinges for these panels, the view including a dotted line showing of the panels in a mid position as in the unfolding or folding of the cover panel, so as to better illustrate the mode of operation.

The same reference numerals are applied to corresponding parts throughout these views.

The reference numeral 4 designates the cabinet, in the bottom portion of which there is a drawer compartment 5 for the catch-all drawer 6, this compartment extending the full depth of the cabinet below the horizontal partition 7. A vertical partition 8 extends between the partition 7 and the top wall 9 to define a projector compartment 10 in the rear of the cabinet to house the projector 11 with its supporting panel 12. The compartment 13 in front of the partition 8 is for a film storage rack 14 that is made up of a number of vertical partitions 15 carrying the vertically spaced shelves 16. The projector supporting panel 12 is of rectangular form and is hinged on its bottom side at one end, as indicated at 17 in Fig. 3, in one end of the rectangular opening 18 provided in the top wall 9 of the cabinet, and is swingable downwardly in said opening to a substantially vertical position to support the projector 11 in the out of the way position illustrated in Fig. 2. In the operating position of the projector 11, shown in Fig. 1, its projection axis $ab$ is substantially horizontal and parallel to the front of the cabinet, so that the operator has access to all of the rack 14 without interfering with the operation of the projector 11 and can remove and replace films at his leisure. In the stored position the projector 11 is in a position at right angles to its operating position, with the axis ab vertical, as appears in Fig. 2. A top cover panel 19 is hinged on its upper side at one end to one end of the top wall 9, as indicated at 20, to swing from the unfolded horizontal position shown in Figs. 1 and 3 to the closed or folded position shown in Fig. 2 in which it covers up the opening 18 and forms a neat top for the cabinet. Doors 21 and 22 are hinged to the front of the cabinet to swing inwardly toward each other to cover up the front of the film storage rack 14 and drawer 6 when the doors are closed. It will be seen, therefore, that I have provided a cabinet of the kind mentioned in which the projector can be accommodated nicely in the same cabinet with the films to be shown, and adequate space is left in the drawer 6 for all of the odds and ends, such as extension cords, motion picture camera, packages of unexposed films, tripod, camera carrying cases, light meter, etc., for which there would not be adequate space in the rack 14. The rack can, of course, be suitably indexed if desired, so that the operator can keep his films in an orderly arrangement and can quickly and easily remove and replace films while operating the projector. The base 23 of the projector is fastened to a panel 24 which in turn is fastened to the panel 12 for secure support of the projector on the panel 12. The opening 18 is, of course, long enough to afford sufficient head room for the projector 11 in its swinging movement into and out of the compartment 10 about the axis of the hinges 17 as a center.

In order that the operator will not have to run the risk of touching anything hot and will not have to wait until the projector 11 has cooled off before he closes up the cabinet, I prefer to provide one or more fall support links 25 pivotally connected at one end, as at 26, to the cover panel 19 and slidably pivotally connected at its other end to the projector supporting panel 12, as indicated by the screw 27 on the panel 12 working in a slot 28 provided in the link 25. A groove 29 is provided in the inner end of the cover panel 19 in alignment with a groove 30 in the adjacent end portion of the top wall 9 to accommodate the link 25, and the side edge of the panel 12 is rabbeted, as indicated at 31, to slidably accommodate the link 25. With this interconnection of the panels 12 and 19 by the fall support link 25, the panel 12 is automatically raised as the panel 19 is unfolded, and the panel 12 is automatically lowered as the panel 19 is folded, and the fall support link provides mutual support for the two panels 19 and 12 when disposed in their co-extensive horizontal operative position, as shown in full lines in Fig. 3. In the folding and unfolding of the panel 19 the pivot 26 moves in an arc indicated by dot and dash lines at 32, and inasmuch as the pivot 26 is spaced from the axis of hinges 20 slightly farther than the distance between the axes of hinges 17 and 20 the link 25 will extend vertically downwardly from the pivot 26 in the vertical position of the panel 12, and the link 25, in the unfolding of the panel 19, will be slid endwise in the rabbet 31 and exert more and more leverage on the panel 12 to raise it, the maximum leverage being obtained when the cover panel 19 is in its fully unfolded position. This is important from the standpoint that it imposes less strain on the pivot 26 throughout the period of operation of the projector so that even in the event the operator forgets to lock the panel 12 to the top wall 9 by means of the latch bolt 33, there will be no danger of the pivot pin 26 being subjected to excessive shear strains. The latch bolt 33 enters a keeper hole 34 in the top wall 9 in one end of the opening 18 and makes the panel 12 rigid with the top wall 9 so that the operator can, if he cares to do so, bear down on the panel 12 while operating the projector 11, without any danger of the panel 12 giving way and causing the cover panel 19 to rise. The fastening of the bolt 33 will, of course, relieve the fall support link 25 of the load of the projector and panel 12 so that the line 25 then serves only as a fall support for the panel 19. There is enough space between the cover panel 19 and top wall 9 in the closed position of the cover panel for ventilation of the projector compartment 10, and, if desired, ventilation holes 35 may be provided in the back wall 36 of the cabinet in the lower portion of the compartment and in the vicinity of the projector 11 in its stored position, as indicated in Fig. 2, to give a stack effect and help to cool the hot projector quickly, cool air entering these holes and flowing upwardly over the projector and out through the opening 18. It should also be clear that although the interconnected panels 12 and 19 are herein described and illustrated as applied to a motion picture projector for a home moving picture cabinet, a similar combination of panels could be used in a sewing machine cabinet, mounting the sewing machine head on the panel 12 instead of the projector.

It is believed the foregoing description conveys a good understanding of the objects and advantages of my invention. The appended claims have been drawn to cover all legitimate modifications and adaptations.

I claim:

1. A motion picture projector cabinet comprising a cabinet body having a top wall with an opening therein, a projector supporting panel hinged to the top wall of said cabinet adjacent one end of said opening to swing upwardly from a depending position suspended in the cabinet to a raised horizontal position in said opening, a top cover panel for the cabinet hinged at one end thereof to the top of the cabinet on an axis parallel with and adjacent to the hinge connection of said projector supporting panel therein, and a link for actuating said first panel to and from raised position upon unfolding and folding of said cover panel and for supporting said first panel in raised position, said link being pivotally connected at one end to said top cover panel at a point spaced from the hinged end thereof and slidably pivotally connected at the other end thereof to said projector supporting panel at a point spaced from the hinged end thereof and arranged to rest intermediate its ends on said cabinet body extending across the axes of both of said hinges for joint mutual support of said panels in coplanar relationship.

2. A projector supporting cabinet comprising a cabinet having a top opening, a top cover panel hinged at one end thereof to said cabinet adjacent one end of said top opening and adapted to swing through an arc of 180° from a closed horizontal position over said top opening to an oppositely disposed open horizontal position, a projector supporting panel hinged to said cabinet adjacent the same end of said top opening as said top cover panel and adapted to swing through an arc of 90° from a suspended position in said cabinet to a horizontal position closing the open top thereof and coplanar with the top cover panel in open position of the latter, and a link pivotally connected at one end to said top cover panel at a point spaced from the hinged end thereof and slidably pivotally connected at its other end to said projector supporting panel at a point spaced from the hinged end thereof and arranged to permit initial opening movement of said top cover panel before imparting a lifting motion to said projector supporting panel, said link being adapted to fulcrum slidably upon the top of said cabinet to swing said projector supporting panel to raised position upon continued opening movement of said top cover panel and to extend across the axes of both of said hinges for joint mutual support of said panels in coplanar relationship.

3. In combination, a cabinet having a top with a substantially rectangular opening provided therein, a panel hinged to said top at one end of said opening adapted to swing upwardly from a depending position suspended in the cabinet to a raised horizontal position in said opening, a top cover for the cabinet hinged at one end thereof to the top of the cabinet on an axis in spaced parallel relation to and adjacent the hinge connection of the aforesaid panel, and a link for positively moving said panel to and from raised horizontal position in the unfolding and folding of said cover and for supporting said panel in raised horizontal position, said link being pivotally connected at one end to said cover at a point spaced from the hinged end thereof and slidably pivotally connected at the other end thereof to said panel at a point spaced from the hinged end thereof and arranged when supporting the panel in raised horizontal position to rest intermediate its ends on the top of said cabinet extending across the axes of both of said hinges for joint mutual support of said panel and cover in substantially coplanar relationship.

4. In combination, a cabinet having a top with a substantially rectangular opening provided therein, a panel hinged to said top at one end of said opening adapted to swing upwardly from a depending position suspended in the cabinet through an arc of 90° to a raised horizontal position in said opening and in coplanar relationship with the top of the cabinet, a top cover for the cabinet hinged at one end thereof to the top of the cabinet on an axis in spaced parallel relation to and adjacent the hinge connection of the aforesaid panel and adapted to swing through an arc of 180° from a closed horizontal position over said top to an oppositely disposed horizontal position in coplanar relationship to the top, and a link for positively moving said panel to and from raised horizontal position in the unfolding and folding of said cover and for supporting said panel in raised horizontal position, said link being pivotally connected at one end to said cover at a point spaced from the hinged end thereof and slidably pivotally connected at the other end thereof to said panel at a point spaced from the hinged end thereof and arranged to permit initial opening movement of said cover before imparting a lifting motion to the panel, said link being adapted during a portion of the unfolding of the cover to fulcrum slidably on the hinged end of said panel so as to swing said panel upwardly in the final unfolding movement of said cover, said link finally resting intermediate its ends on the top of said cabinet extending across the axes of both of said hinges for joint mutual support of said panel and cover in substantially coplanar relationship.

HAROLD J. KASLER.

REFERENCES CITED

The following references are of record in the file of this patent:

UNITED STATES PATENTS

| Number | Name | Date |
| --- | --- | --- |
| 27,064 | Parker | Feb. 7, 1860 |
| 490,116 | Kundtz | Jan. 17, 1893 |
| 1,172,945 | Cook | Feb. 22, 1916 |
| 1,410,977 | Weeks | Mar. 28, 1922 |
| 2,190,229 | Bradley | Feb. 13, 1940 |